US008645678B2

(12) United States Patent
Al-Dweik et al.

(10) Patent No.: US 8,645,678 B2
(45) Date of Patent: Feb. 4, 2014

(54) CHAOTIC CRYPTOGRAPHY FOR OFDM BASED COMMUNICATIONS SYSTEMS

(75) Inventors: Arafat Al-Dweik, Abu Dhabi (AE); Chan Yeob Yeun, Abu Dhabi (AE)

(73) Assignee: Khalifa University of Science, Technology & Research (Kustar), Abu Dhabi (AE)

( * ) Notice: Subject to any disclaimer, the term of this patent is extended or adjusted under 35 U.S.C. 154(b) by 147 days.

(21) Appl. No.: 13/329,935

(22) Filed: Dec. 19, 2011

(65) Prior Publication Data
US 2013/0159698 A1 Jun. 20, 2013

(51) Int. Cl.
*H04L 29/06* (2006.01)

(52) U.S. Cl.
USPC .......................................... 713/151; 713/150

(58) Field of Classification Search
USPC .................. 713/150, 151; 380/270, 256, 210
See application file for complete search history.

(56) References Cited

U.S. PATENT DOCUMENTS

| 6,650,616 | B2 | 11/2003 | Crawford |
| 7,649,951 | B2 | 1/2010 | Moffatt |
| 7,751,488 | B2 | 7/2010 | Moffatt |
| 7,752,430 | B2 | 7/2010 | Dzung |
| 2005/0055546 | A1* | 3/2005 | Dzung .......................... 713/151 |
| 2008/0137718 | A1* | 6/2008 | Cha et al. ....................... 375/146 |
| 2011/0033051 | A1 | 2/2011 | Steer et al. |

OTHER PUBLICATIONS

Al-Dweik, A., "A Novel Non-Data-Aided Symbol Timing Recovery Technique for OFDM Systems," IEEE Transactions on Communications, (2006), vol. 54, No. 1, pp. 37-40.

Al-Dweik, A. et al., "Efficient OFDM Symbol Timing Estimator Using Power Difference Measurements".

"Data Encryption Standard (DES)", Federal Information Processing Standards Publication, U.S. Department of Commerce, (1999), Publication No. 46-3.

Advanced Encryption Standard (AES), Federal Information Processing Standards Publication, U.S. Department of Commerce, (2001), Publication No. 197.

Chorti, Arsenia, et al., "Masked M-QAM OFDM: A Simple Approach for Enhancing the Security of OFDM Systems", IEEE 20th International Symposium on Personal, Indoor and Mobile Radio Communications, (2009), pp. 1682-1686.

Khan, Muhammad Asif et al., "On Secure OFDM System: Chaos Based Constellation Scrambling", International Conference on Intelligent and Advanced Systems, (2007), pp. 484-488.

\* cited by examiner

*Primary Examiner* — William Goodchild
*Assistant Examiner* — Nega Woldemariam
(74) *Attorney, Agent, or Firm* — Renner, Otto, Boisselle & Sklar, LLP (57) ABSTRACT

A chaotic cryptographic technique for orthogonal frequency division multiplexing (OFDM) based wireless/wired communication systems is implemented with an OFDM symbol structure based on symmetric key cryptography. At the receiver side, data detection becomes infeasible without knowledge of the secret key. Without the knowledge of the key, the signal will be a noise-like signal. The computational power required to implement the technique is very low, rendering the system an attractive option for high data rate communications based on OFDM technology. The system security is proportional to (L×N)! where N is the number of subcarriers in the OFDM system and L is the number of OFDM symbols involved in the encryption process. For OFDM applications where ≥256, L may be set to 1 and breaking the system would require N! exhaustive-search trials. In the case that N<256, L may be increased.

9 Claims, 4 Drawing Sheets

CHAOTIC CRYPTOGRAPHY FOR OFDM BASED COMMUNICATIONS SYSTEMS

TECHNICAL FIELD

This disclosure relates to security in communication systems that use an orthogonal frequency division multiplexing (OFDM) modulation scheme. More specifically, this disclosure relates to the structure of OFDM symbols to create a secured communication system.

BACKGROUND

Orthogonal frequency division multiplexing (OFDM) has gained considerable interest by the research community and industry due to its highly desirable features for wireless transmission. Consequently, OFDM has been considered for several applications and standards, such as Wireless Local Area Network (WLAN, IEEE 802.11a and IEEE 802.11n), Worldwide Interoperability for Microwave Access (WiMax, IEEE 802.16), and Mobile Broadband Wireless Access (MBWA, IEEE 802.20). Although OFDM is highly robust against various transmission impairments, it does not have any inherent security features. Hence, additional encryption/decryption algorithms should be implemented for data security.

One type of secure communication algorithm is a block cipher. The main building parts of a block cipher are a round function based on a nonlinear operation, mixing component and round keys. If the number of rounds is more than 32, breaking this cipher will be very difficult. The main limitation of commonly designed ciphers is their low speed, which is a major drawback for today's broadband systems.

Digital encryption is usually applied to the transmitted bits at the data link layer or at higher protocol layers of the communication protocol stack. Block encryption techniques permute blocks of bits in a key-dependent way, while stream ciphers first generate a key-dependent pseudo-random binary key stream, which is then XOR-ed with the plaintext bit sequence to produce the cipher text. An eavesdropper without access to the key cannot easily recover the plaintext from an intercepted cipher text.

The Data Encryption Standard (DES) is classified as a block cipher and has been used worldwide in the banking communities and for electronic fund transfers. Due to concerns about security of DES—such as a short key size (e.g., 56 bits), slow operation, and differential and liner cryptanalysis—security communities have sought to replace DES with more robust algorithm. Therefore, a new symmetric key cryptosystem, the Advanced Encryption Standard (AES) was announced in 2001. AES is efficient in hardware and software implementations with various key sizes of 128, 192 and 256 bits.

Although there are several cryptosystems designed to operate at the lowest layers (physical layer) of the protocol stack for OFDM based systems, such techniques are usually designed to function at the bit or symbol level. For example, European Patent No. 1 513 279 B1 describes a system that encrypts the baseband QAM symbols by changing their phase according to a given key sequence before the inverse fast Fourier transform (IFFT) process. Moreover, the training symbols that are embedded for synchronization and channel estimation are encrypted as well. Consequently, the encryption process hides the necessary information required for synchronization and channel estimation, which are necessary to recover the encrypted data symbols. Furthermore, the data symbols themselves are encrypted as well. The main limitation of this approach is that it is suitable only for systems with training symbols. Future communication systems may not rely on pilot symbols for synchronization and channel estimation as several blind techniques have been proposed. Moreover, the performance of this technique mainly relies on channel conditions. If the channel is flat, it should not be difficult to estimate the channel parameters, even with encrypted pilots.

U.S. Pat. Nos. 7,751,488 and 7,649,951 describe a security system for OFDM by mixing the phases of the data symbols and varying the data-to-subcarrier assignment based on a secret key sequence. Therefore, an eavesdropper needs first to know the mapping between data and subcarriers, and then the phase/amplitude of the data symbols. Similar to the above mentioned systems, there are several other encryption systems that are based on the general concept of building an encryption technique by scrambling the frequency domain symbols (e.g., U.S. Patent Application Publication No. US 2011/0033051; A. Chorti and I. Kanaras, "Masked M-QAM OFDM: A simple approach for enhancing the security of OFDM systems," IEEE 20th International Symposium on Personal, Indoor and Mobile Radio Communications (PIMRC), vol., no., pp. 1682-1686, 13-16 Sep. 2009; and M. Khan, M. Asim, V. Jeoti and R. Manzoor, "On secure OFDM system: Chaos based constellation scrambling," International Conference on Intelligent and Advanced Systems (ICIAS), pp. 484-488, November 2007).

Unlike the approaches described in the previous paragraph, very little research has been conducted to perform encryption/decryption using the time-domain samples of OFDM signals. However, U.S. Pat. No. 6,650,616 describes introducing intentional group delay to one or more subcarriers at the transmitter using a series of filters. The group delay is supposed to destroy the frequency orthogonality of the signal and hence prevent correct data detection. In principle, there are a very large number of different group delays that may be applied. Therefore, it should be infeasible for an eavesdropper to ascertain the introduced group delay. However, the main limitation of this system is the high computational complexity as the number of divisions and multiplications to encrypt each OFDM symbol is quite large.

SUMMARY

In this disclosure, described is a highly efficient encryption/decryption algorithm for OFDM based systems. Unlike other systems, the disclosed system operates on the time-domain samples after the IFFT. Consequently, the disclosed system will have strong security as well as low computational complexity, which makes the system attractive for high speed broadband communication systems.

The development of a highly secured cryptosystem that is specifically tailored for OFDM systems may remarkably improve the system's efficiency because conventional cryptosystems are considered as overhead since they are implemented as a separate layer in OFDM-based systems. Developing a new cryptosystem that utilizes the unique structure of OFDM systems leads to combined modulation and security that eliminates the extra overhead introduced by conventional cryptosystems. In this disclosure, the OFDM unique structure is exploited to develop a secured wireless communication system that relies on the sensitivity of OFDM systems to synchronization errors. At the transmitter side, encryption is performed by hiding some necessary synchronization information based on a secret key sequence. At the receiver side, decryption is impeded without the knowledge of the correct synchronization parameters. For an attacker who does not have the correct key, the received signal will appear as a noise-like signal. In this sense, the developed system is denoted as a chaotic cryptographic system.

BRIEF DESCRIPTION OF THE DRAWINGS

The subject matter of the disclosure will be explained in more detail in the following text with reference to preferred exemplary embodiments that are illustrated in the attached drawings, in which.

DETAILED DESCRIPTION

OFDM System Description

OFDM is a multicarrier technique in which the serial data stream $d_k$ is converted to N parallel streams $d(l)=[d_o(l), d_1(l), \ldots, d_{N-1}(l)]^T$ that are used to modulate N orthogonal subcarriers during the $l^{th}$ OFDM symbol block l=0, ..., L−1.

Figure 1:
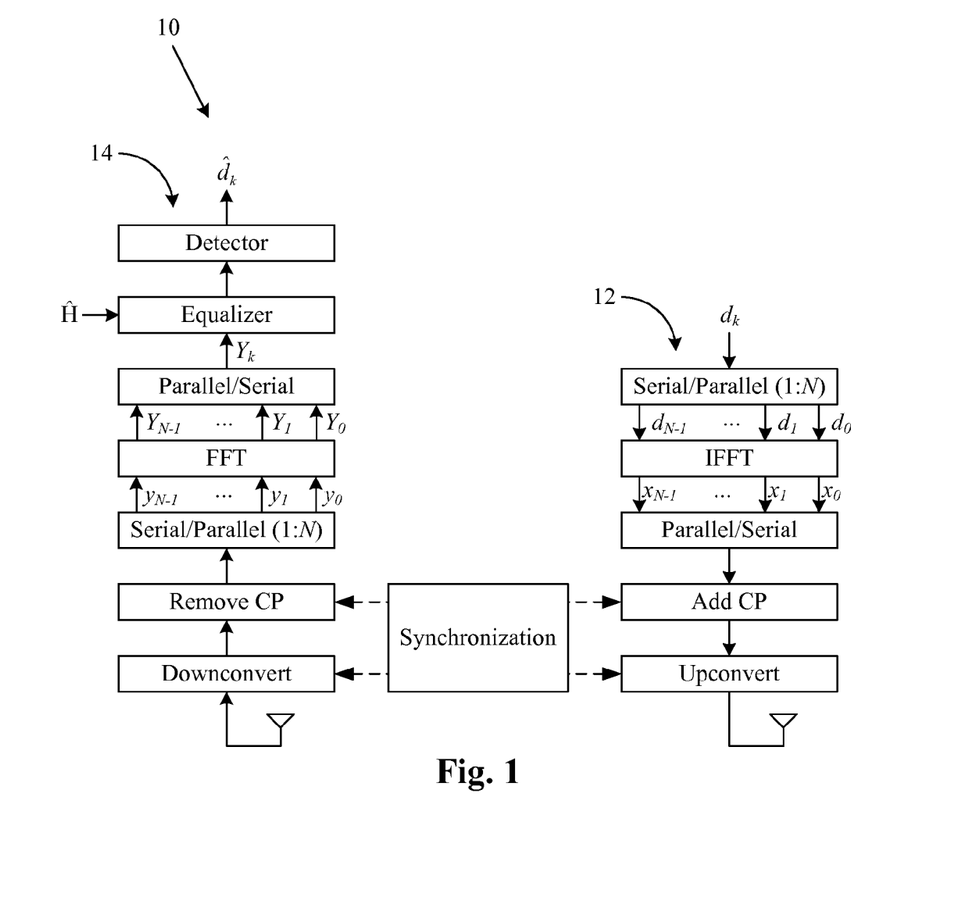
FIG. 1 is a high level block diagram of an orthogonal frequency division multiplexing (OFDM) transmitter and receiver, including sub-blocks of serial-to-parallel and parallel-to-serial converters, an inverse fast Fourier transform (IFFT), and a fast Fourier transform (FFT), where an upconverter and a downcoverter are responsible for conditioning the signal for transmission/reception at a particular carrier frequency.

The elements of the data sequence d are complex symbols that are drawn uniformly from a quadrature amplitude modulation (QAM) or M-ary phase shift keying (MPSK) symbol constellations. As depicted in FIG. 1, shown is an exemplary system 10 for implementing the modulation process. The system includes a transmitter 12 and a receiver 14. The modulation process is implemented efficiently by applying the set of data symbols d to an N-point inverse fast Fourier transform (IFFT) process to produce the sequence x that consists of N time-domain samples, $x(l)=[x_o(l), x_1(l), \ldots, x_{N-1}(l)]^T$. The modulation is performed by multiplying the data vector d by the normalized N×N IFFT matrix $F^H$ as in Equation 1.

$$x(l) = F^H d(l) \quad (1)$$

The matrix $F^H$ is the Hermetian transpose of a normalized N×N FFT matrix. The IFFT matrix may be defined as set forth in Equation 2, where $$\omega = \frac{2\pi}{N}.$$

$$F^H = \frac{1}{\sqrt{N}} \begin{bmatrix} 1 & 1 & \cdots & 1 \\ 1 & e^{j\omega} & \cdots & e^{j(N-1)\omega} \\ \vdots & \vdots & \ddots & \vdots \\ 1 & e^{j(N-1)\omega} & \cdots & e^{j(N-1)^2\omega} \end{bmatrix} \quad (2)$$

Therefore, the $n^{th}$ sample in the sequence x(l) may be expressed as set forth in Equation 3.

$$x_n(l) = \frac{1}{\sqrt{N}} \sum_{i=0}^{N-1} d_i(l) e^{j\frac{2\pi i n}{N}}, n = 0, 1, \ldots N-1 \quad (3)$$

In multipath fading channels, inter-symbol-interference (ISI) may occur due to the delayed arrival of the multipath components. To combat the ISI and assure ISI-free reception, a time-domain guard-band, denoted as CP, is created by copying the last $N_{CP}$ samples of the IFFT output and appending them at the beginning of the symbol to be transmitted. The value of $N_{CP}$ is preferably greater than the channel impulse response.

Therefore, the transmitted OFDM block, denoted as $x_{CP}$, consists of N+$N_{CP}$ samples with the following frame structure of Equation 4.

$$x_{CP}(l) = [x_{N-N_{CP}}(l), \ldots, x_{N-1}(l), x_0(l), \ldots x_{N-1}(l)]^T \quad (4)$$

The useful part of the OFDM symbol does not include the $N_{CP}$ prefix samples and has a duration of $T_u$ seconds.

At the receiver front-end, the received signal is applied to a matched filter and then it is sampled at a rate $$T_s = \frac{T_u}{N}.$$

After dropping the $N_{CP}$ samples, the received sequence $y(l)=[y_0(l), y_1(l), \ldots, y_{N-1}(l)]^T$ is obtained as in Equation 5.

$$y(l) = H(l)x(l) + z(l) \quad (5)$$

The system noise $z(l)=[z_o(l), z_1(l), \ldots, z_{N-1}(l)]^T$ is modeled as a white Gaussian process with zero mean and variance $\sigma_z^2 = E[|z_n|^2]$, H(l) denotes the channel frequency response matrix during the $l^{th}$ OFDM block. By dropping the block index l, to simplify the notations, and assuming that the channel remains fixed for one block period, the matrix H may be expressed as set forth in Equation 6.

$$H = \begin{bmatrix} h_0 & h_{N-1} & \cdots & h_1 \\ h_1 & h_0 & \ddots & \vdots \\ \vdots & \vdots & \ddots & h_{N-1} \\ h_{N-1} & h_{N-2} & \cdots & h_0 \end{bmatrix} \quad (6)$$

The discrete-time channel impulse response samples $h_p=0$ $\forall \, p \geq P$ where P is the channel order and P<$N_{CP}$. It may be observed from Equation 6 that H is a circulant matrix hence it will be diagonalized by the IFFT/FFT matrices FHFH=$H_D$ where $H_D$ is N×N diagonal matrix whose $i^{th}$ diagonal elements may be expressed using Equation 7.

$$H_i(l) = \sum_{p=0}^{L_k-1} h_p(l) e^{-j\frac{2\pi p}{N(N-i+1)}} \quad (7)$$

The received samples may be written using Equation 8.

$$y(l) = F^H H_D(l) d(l) + z(l) \quad (8)$$

In equation 8, the $n^{th}$ element of y may be expressed using Equation 9.

$$y_n(l) = \frac{1}{\sqrt{N}} \sum_{i=0}^{N-1} d_i(l) H_i(l) e^{j\frac{2\pi n i}{N}} + z_n(l) \quad (9)$$

The N time-domain samples are then applied to the fast Fourier transform (FFT) to produce the decision variables that will be used to reproduce the transmitted symbols, which may be achieved using Equation 10.

$$Y(l) = F y(l) \quad (10)$$

The $k^{th}$ information symbol in Y may be expressed using Equation 11.

$$Y_k(l) = \frac{1}{N} \sum_{n=0}^{N-1} \sum_{i=0}^{N-1} d_i(l) H_i(l) e^{j\frac{2\pi n i}{N}} e^{-j\frac{2\pi n k}{N}} + \eta_k(l) \quad (11)$$
$$= d_k(l) H_k(l) + \eta_k(l)$$

In Equation 11, $$\eta_k = \frac{1}{\sqrt{N}} \sum_{n=0}^{N-1} z_n e^{-j\frac{2\pi n k}{N}}$$

is a Gaussian random variable with the same statistical properties as $z_n$. The decision variables $Y_k$ are then fed to the detector, which is based on the maximum likelihood (ML) criterion, to reproduce the transmitted data. As shown in FIG. 1, the outputs of the detector are estimates of the original data symbols. If the estimated symbol $\hat{d}_k = d_k$ then the estimated symbol is received correctly, otherwise, a symbol error has occurred.

Without loss of generality, it may be assumed that the channel is noiseless ($\sigma_z^2 = 0$) and the channel matrix H=I. Therefore, the output of the FFT may be expressed using Equation 12, where the time-domain samples are given by Equation 3.

$$Y_k(l) = \frac{1}{N} \sum_{n=0}^{N-1} x_n e^{-j\frac{2\pi n k}{N}} \quad (12)$$
$$= d_k(l)$$

Secured OFDM System Description

As may be noted from Equation 12, each sample $x_n$ is formed by mixing all data symbols $d_0, \ldots, d_{N-1}$. To recover the data symbols, all the time-domain samples $x_n$, $n=0, \ldots, N-1$ should be known at the receiver. Hiding the original values of $x_n$ or loosing part of them will prevent correct data recovery. Consequently, if a particular function $\mathcal{F}$ is used to hide the original values of each sample $x_n$ it will be, for practical purposes, impossible to recover the data symbols $d_k$ without errors if $\mathcal{F}$ is not known at the receiver side. Therefore, if $\mathcal{F}$ is chosen such that it cannot be guessed by the attackers, and the information loss due to the absence of information about $\mathcal{F}$ is maximized, the data symbols $d_k$, $k=0, \ldots, N-1$ may be considered to be secured. However, the samples $x_n$ are analog, $$-N^{-\frac{1}{2}} \leq x_n \leq N^{\frac{1}{2}},$$

hence one-way functions based on discrete mathematics that are used in conventional security systems may not be suitable for this system.

It may be observed that the data symbols $d_k$ cannot be recovered correctly unless:
1. All the samples $x_n$, belong to the same OFDM block l.
2. All the samples $x_n$ are placed in the right order, i.e., $x_0$, $x_1, \ldots, x_{N-1}$.

However, the information loss is proportional to the number of samples included from other OFDM blocks, and/or the number of samples that are out of order. In general, the output of the FFT when the N-samples block comprises samples from other OFDM symbols, or out of order samples, may be expressed using Equation 13.

$$d_k(l) = \alpha_k(l) d_k(l) + \beta_k(l) \quad (13)$$

In Equation 13, $\alpha$ is an attenuation factor and $\beta$ is the interference. Both $\alpha$ and $\beta$ depend on how many samples belong to the $l^{th}$ OFDM symbol, and how many samples are in correct order. Consequently, the useful data symbols at the output of the FFT will be significantly attenuated and heavily buried in interference. As a result, the transmitted data is secured by either reordering the time-domain samples $x_n(l)$, mixing the samples of the L different OFDM symbols, or both mixing and reordering the samples of L OFDM blocks.

Figure 2:
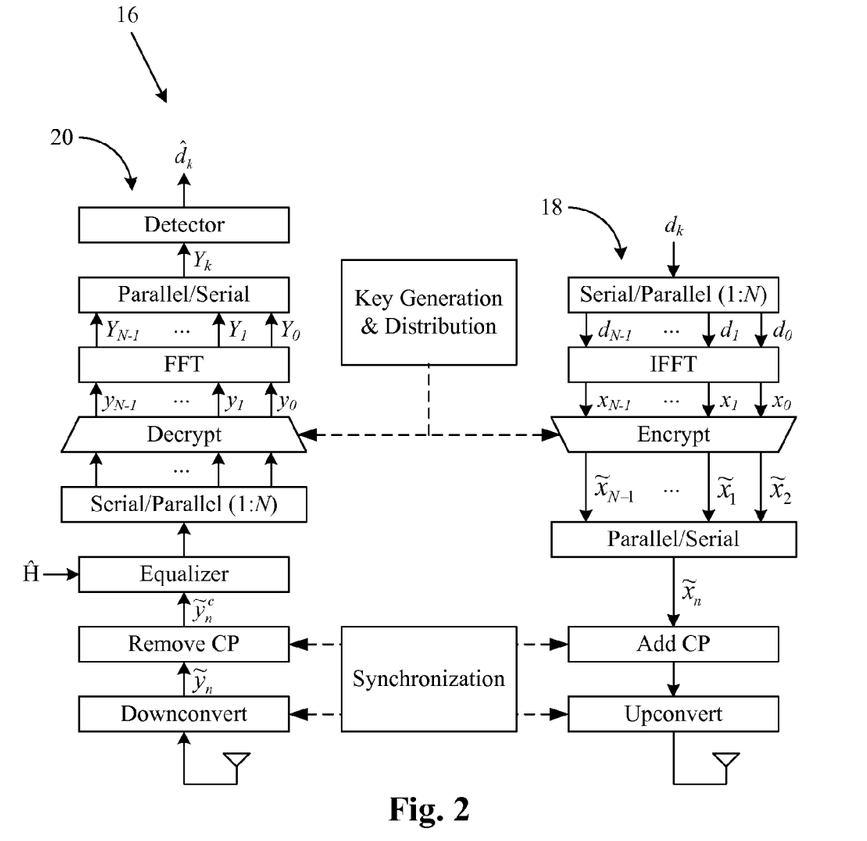
FIG. 2 is a high level block diagram of a crypto OFDM system.

A high level block diagram of a secured OFDM system 16 is depicted in FIG. 2, and includes a transmitter 18 and a receiver 20. As compared to the OFDM system 10 shown in FIG. 1, the secured OFDM system 16 has an extra encryption block following the IFFT at the transmitter 18 side, and a decryption block before the FFT at the receiver 16 side. Therefore, the encryption system 16 presented in FIG. 2 may be described as follows.

First, the serial data symbols are converted to parallel frames using the serial/parallel converter shown in FIG. 2., where each parallel block consists of N data symbols.

Second, the parallel data blocks are used to modulate N orthogonal subcarriers using the IFFT block as described in Equation 1.

Figure 3:
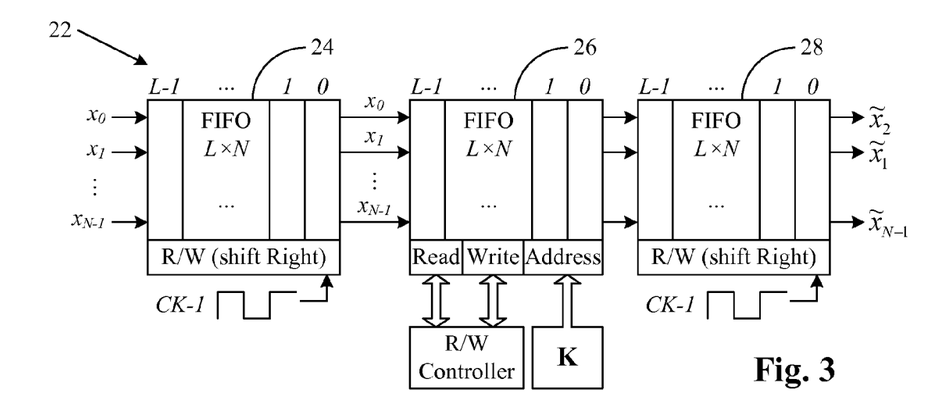
FIG. 3 is a block diagram of an encryption system, including sub-blocks of a first-in first-out buffer (FIFO) and a random access memory (RAM), where data in the RAM is read based on an address specified by a sequence K.

Third, the encryption process may be implemented with the encryption assembly 22 shown in FIG. 3 using an input an L×N first-in first-out buffer (FIFO) 24 followed by an L×N random access memory (RAM) 26, which is followed by another L×N FIFO 28. Initially, both of the FIFOs 24, 28 and the RAM 26 are cleared. Then, the L OFDM blocks are loaded sequentially into the FIFO 24. Once the first OFDM block is loaded into column 0 in the FIFO 24, it will be written in the RAM 26 using a read/write (R/W) controller 30 according to the locations specified by the key sequence K={$K_{n,l}$, n=0, \ldots, N-1, l=0, \ldots, L-1} where n specifies the sample number and/specifies the OFDM block number. For example, the first sample of the first OFDM block $x_o(0)$ will be written to location $K_{n,l}$. Once the RAM 26 is full, its contents are shuffled column-by-column to the next FIFO 28. At the stage where the RAM 26 is full, the R/W controller 30 will stop writing to the RAM 26, and the next writing cycle will start only after the RAM 26 is emptied. While the RAM 26 is in the reading cycle, new incoming data will be stored in the FIFO 24. After L OFDM blocks, the RAM 26 will be empty and the FIFO 24 will be populated, and the RAM 26 reading will be enabled again. This process will be repeated periodically. The input FIFO 24 is used as a buffer to store the samples while the RAM 26 is in the reading mode, while the output FIFO 28 is used to assure that samples are read at a rate that equals their original rate as the RAM 26 may be clocked at higher speeds to minimize delay. The input and output FIFOs 24, 26 are clocked at the same data rate speed, denoted as CK-1 in FIG. 3. Therefore, the output samples will have a fixed delay of L×N samples.

Fourth, the CP is added by copying the last $N_{CP}$ samples and appending them at the beginning of each column.

Fifth, the encrypted samples and the CP are converted to a serial stream, which is then upconverted to a particular carrier frequency.

At the receiver 20 side, perfect frequency and symbol timing and phase synchronization are assumed, as well as perfect channel state information. Consequently, the following steps are performed to recover the original data.

First, the received signal is down converted to baseband and sampled at a rate equal to the transmitted samples rate. The process includes frequency synchronization between the transmitter and the receiver.

Second, the CP samples are discarded. This process includes symbol timing synchronization.

Third, compensation for channel effects is performed before the FFT process. The estimated channel matrix $\hat{H}$ is assumed to be equal to the channel matrix H.

Fourth, the decryption process is performed using the same configuration shown in FIG. 3. However, the RAM 26 is loaded sequential (as a FIFO) during the writing cycle, and it will be read according to the address specified by the key sequence K.

EXAMPLES

For an enhanced explanation, but without limiting inventive aspects of the disclosure, two examples are considered as possible scenarios in which the encryption/decryption processes are implemented. In the first example, the case where the samples of OFDM block are randomly permutated among themselves to perform the encryption is considered. In the second example, the samples from two consecutive OFDM blocks are randomly mixed, without changing the order of the samples.

Example-I

Samples are Collected from a Single OFDM Block

Assume that before transmission, the N time-domain samples of the $l^{th}$ OFDM symbol at the IFFT output are reordered according to a pseudorandom sequence $K=[K_0, K_1, \ldots, K_{N-1}]$, $K_i \in \{0, 1, \ldots, N-1\}$. Hence the value of $K_i$ indicates the original location of the sample before encryption. Therefore, the encrypted symbol may be expressed using Equation 14, where $\mathcal{F}$ is the function used to mix the samples of the vector x. For example, if $K_i=\lambda$, then $\tilde{x}_i=x_\lambda$.

$$\tilde{x}(l) = \mathcal{F}(x(l), K) \neq F^H d(l) \quad (14)$$

The transmitted samples sequence passes through a multipath channel with $L_h$ taps. The received signal, after removing the CP samples, is given by $\tilde{y}(l)=H(l)\tilde{x}(l)+z(l)$.

For coherent detection, the channel matrix should be estimated and compensated accurately before the FFT computation. To simplify the presentation of the system, we assume that the estimated channel matrix $\hat{H}$ perfectly matches the actual channel matrix H, i.e., $\hat{H}=H$. Consequently, the received samples after the compensation of the channel effects may be expressed using Equation 15, where $\eta(l)=H^{-1}(l)z(l)$.

$$\tilde{y}^C(l)=H^{-1}(l)\tilde{y}(l)+H^{-1}(l)z(l)=\tilde{x}(l)+\eta(l) \quad (15)$$

Assuming high signal-to-noise ratio (SNR), $H^{-1}(l)z(l) \sim 0$. Thus, $\tilde{y}^C(l) \approx \tilde{x}(l)$ The original order of the samples may be restored by applying the inverse of the process applied at the transmitter side. However, an attacker does not know the function $\mathcal{F}$ because it is based on the unknown sequence K. Hence, another sequence $\mathbb{K} \neq K$ may be chosen randomly by the attacker in the effort to break the system. The outcome of applying the inverse function $\mathcal{F}^{-1}$ may be expressed as, $y(l)=\mathcal{F}^{-1}(\tilde{x}(l), \mathbb{K})$, and decision variables at the output of the FFT may be expressed using Equation 16, where the $k^{th}$ k sample of Y is expressed with Equation 17.

$$Y(l) = F\mathcal{F}^{-1}(\tilde{x}(l), \mathbb{K}) \quad (16)$$

$$Y_k = \frac{1}{N}\sum_{i=0}^{N-1} d_i(l) \sum_{n=0}^{N-1} e^{j\frac{2\pi}{N(\mathcal{F}(n)i-nk)}} \quad (17)$$

From Equation 4, a perfect recovery of the data symbols requires that $\mathbb{K}=K$. Using exhaustive search methods to find K requires N! trials. However, the value of N is typically greater than 256, as in WiMax and DVB-T systems. Therefore, the number of trials required to find K is about 256! trials. It may be concluded that breaking the system using exhaustive search approaches is impractical, if not infeasible.

To assess the performance of this approach, a general OFDM system is simulated over AWGN channels. In the simulation, the number of subcarriers N is 256, the data symbols are selected from a QAM constellations with 4, 16 and 64 levels, and the SNR is set to 30 dB. The number of samples mixed $\mathcal{K}$ varies from zero to 256. The key size needed to represent K is equal to $\mathcal{K} \log_2(\mathcal{K}) \leq 2048$ bits.

Figure 4:
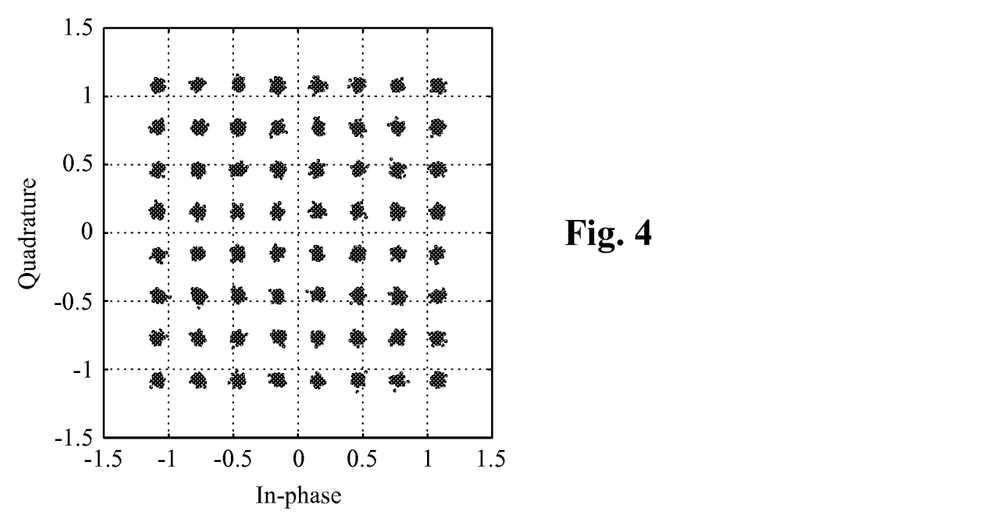
FIG. 4 is a signal constellation diagram of 64-QAM OFDM with a perfectly known key, signal-to-noise ratio SNR=30 dB, and key length $\mathcal{K}$=256.
Figure 5:
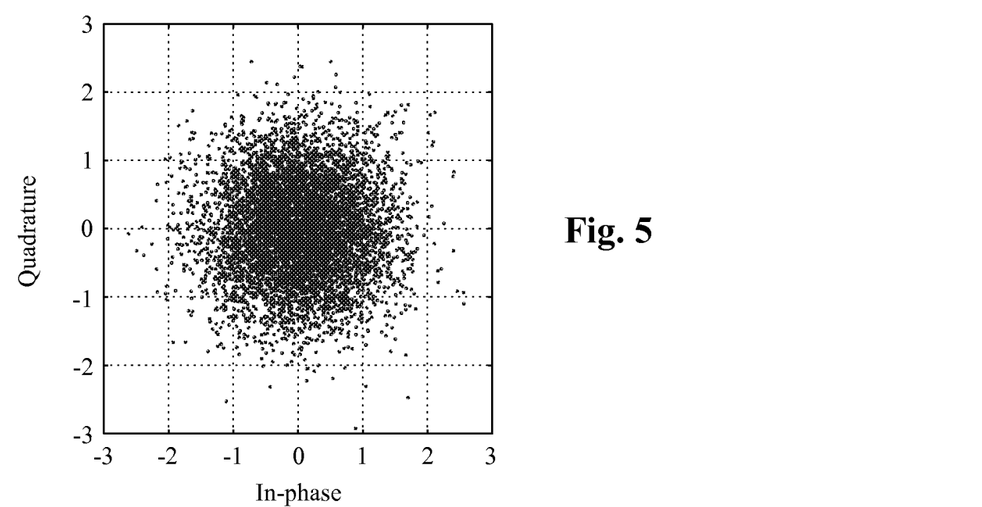
FIG. 5 is a diagram of the received signal constellation of 64-QAM OFDM without the key knowledge, SNR=30 dB, and $\mathcal{K}$=256.

FIGS. 4 and 5 demonstrate the effect of the knowledge of the sequence K on the construction of the symbol constellations at the receiver side for a 64-QAM system. From FIG. 5, the encryption process has effectively destroyed the constellation structure of the received symbols.

Figure 6:
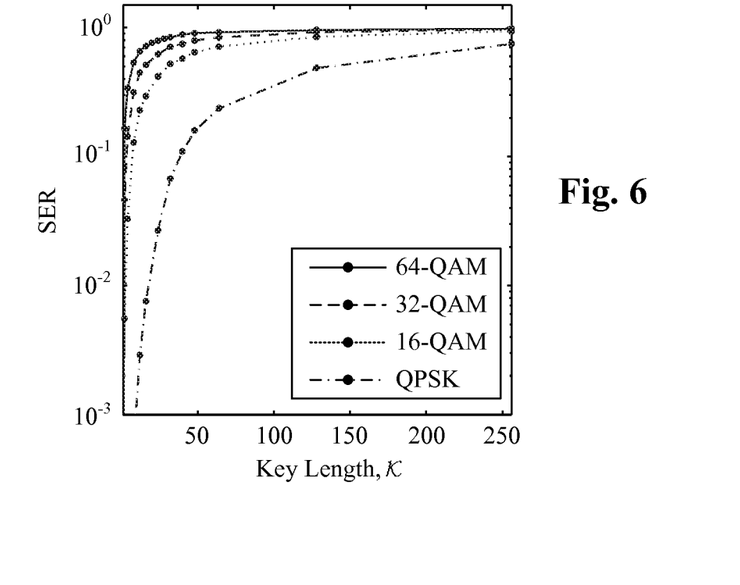
FIG. 6 is a first example plot of SER versus key length using 64, 32, 16 and 4 QAM constellations for different values of $\mathcal{K}$, L=1, out of order samples.

To quantitatively evaluate the performance of the disclosed system 16, a simulation of the symbol error rate (SER) for different values of $\mathcal{K}$ using different QAM levels may be carried out. As depicted in FIG. 6, even if the attacker knows up 200 values of $\mathcal{K}$, it still very difficult to get reliable data as the SER is more than ninety percent (90%) for most QAM values. It is noted that the upper limit for the SER is equal to $$\left(1 - \frac{1}{M}\right).$$

in such a case the receiver is just selecting any of the M possible symbols randomly. The results of FIG. 6 show that this bound is almost achieved for M>4 given that K≥50.

Example-II

Random Interleaving of Samples from L OFDM Blocks

In the second example, the samples from two consecutive OFDM blocks are randomly mixed, without changing the order of the samples. In this approach, L OFDM symbols are buffered and then the L symbols are interleaved according to a secret key K. The simplest case is when L equals 2, and the mixed samples keep their original order. For example, the first sample in the transmitted block is actually the first sample of OFDM block l or l+1, etc. In such a case, the transmitted block will consist of samples that belongs to either x(l) or x(l+1). Consequently, the transmitted block may be expressed using Equation 18, where $\mathcal{J}$ denotes the pseudo random interleaving based on the key K=[$K_0, K_1, \ldots, K-1$], $K_i \in \{0,1\}$.

$$\tilde{x}(l) = \mathcal{J}_K \{x(l), x(l+1), K\} \quad (18)$$

For example, $K_i$ equaling zero means that the $i^{th}$ sample belongs to x(l+1), otherwise it belongs to x(l). As will be apparent, the key length is equal to K≤N, which should be sufficient for OFDM systems with large N values such as DVB-T where N is at least 2048. For OFDM systems with small N values, L OFDM symbols may be invoked in the interleaving process. Another possible solution is to interleave the samples of the two symbols as well as to change their order.

Figure 7:
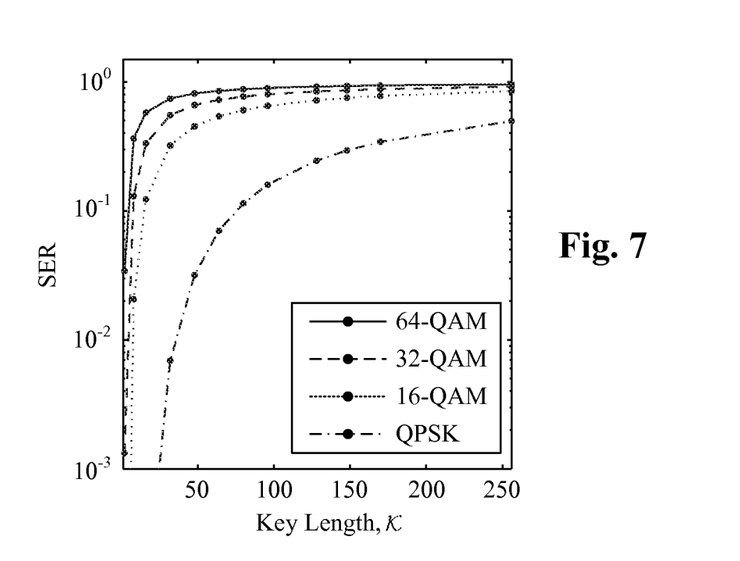
FIG. 7 is a second example plot of SER versus length using 64, 32, 16 and 4 QAM constellations for different values of $\mathcal{K}$, L=2, ordered samples.

Similar to the single system case, the system performance is evaluated for an OFDM system with N=256, SNR=30 dB, and L=2. The samples are interleaved without changing their order, thus the key length is 256 bits. The SER for the considered system is presented in FIG. 7. In general, the SER obtained in the second example are very close to those obtained in the first example.

Conclusion

This disclosure describes a communications security system (e.g., a modem with a transmitter and a receiver (e.g., a transceiver), or a transmitting device and a remote receiving device) for data encryption in the physical layer of an Orthogonal Frequency Division Multiplex (OFDM) transmission protocol. The data is encrypted by altering, at the IFFT output at the transmitter, each of a sequence of the time-domain samples according to an element $K_{n,l}$ of a key stream sequence K, thus creating encrypted samples $\tilde{x}_n$, to be transmitted to the receiver, where the encrypted samples belong to one or more distinct OFDM blocks. The receiver includes a synchronizer/channel estimator for removing channel effects before decryption. Decryption is performed by rearranging the received N×L samples according to the key sequence K. The original data symbols are obtained by applying the decrypted samples to a fast Fourier transform (FFT) and a detector.

What is claimed is:

1. A method of encrypting data at a physical layer of an orthogonal frequency division multiplex (OFDM) data transmission system, comprising:
    mapping a binary data sequence to N QAM symbols, wherein N is an integer;
    modulating a distinct sub-carrier of the OFDM using each of the N QAM symbols in an inverse fast Fourier transform (IFFT) process;
    buffering L OFDM blocks of the output of the OFDM modulation in a buffer, wherein L is an integer;
    providing a key stream sequence K with a length of L×N entries;
    creating encrypted L OFDM symbol blocks $\tilde{x}(l)$ by altering the location of each entry of the buffer according to a corresponding element of a key stream sequence K to establish encrypted samples $\tilde{x}_n$;
    unbuffering and converting the encrypted samples $\tilde{x}_n$ to a serial stream that includes L encrypted blocks; and
    adding a time-domain guard-band sample by copying and prepending a last $N_{CP}$ sample of each encrypted block.

2. The method according to claim 1, wherein the key stream sequence K is a (N,l)-ary sequence with N ∈ {0, N−1} and l ∈ {0, L−1}, and each element $K_{n,l}$ of the key stream sequence K selected to be distinct from the other elements.

3. The method according to claim 2, wherein the original locations of the time-domain samples $x_n$ are alternated as specified by the key elements $K_{n,l}$ of the key stream sequence K.

4. The method according to claim 3, wherein the elements $x_n(l)$ are arranged in the sequence x in the form x(l)=[$x_0(l), x_1(l), \ldots, x_{N-1}(l)$].

5. The method according to claim 2, wherein each of the N samples in the $l^{th}$ OFDM symbols are in a specific location so as to correctly recover data symbols at the receiver.

6. A method of decrypting data at a physical layer of an orthogonal frequency division multiplex (OFDM) data transmission system, comprising:
    receiving a data stream in which each sequence of time-domain samples output by an IFFT at a physical layer of an OFDM transmitter have been altered according to an element $K_{n,l}$ of a key stream sequence K to output encrypted samples $\tilde{x}_n$;
    compensating for a channel transfer function by removing time-domain guard-band samples;
    decrypting the samples by buffering L received blocks and rearranging the samples according to the key sequence K, wherein L is an integer; and
    extracting data symbols by applying the decrypted samples to a fast Fourier transform (FFT) process and a detection process to make a final decision of the symbol values.

7. An Orthogonal Frequency Division Multiplex (OFDM) system, comprising a transmitter embodying a physical layer for transmitting data and the transmitter including one or more hardware components to:
    map a binary data sequence to N QAM symbols, wherein N is an integer;
    modulate a distinct sub-carrier of the OFDM using each of the N QAM symbols in an inverse fast Fourier transform (IFFT) module to output a sequence of time-domain samples from original data symbols;
    buffer L OFDM blocks of the output of the OFDM modulation in a buffer, wherein L is an integer;
    provide a key stream sequence K with a length of L×N entries;
    create encrypted L OFDM symbol blocks $\tilde{x}(l)$ by altering the location of each entry of the buffer according to a corresponding element of the key stream sequence K to output encrypted samples $\tilde{x}_n$;
    unbuffer and convert the encrypted samples $\tilde{x}_n$ to a serial stream that includes L encrypted blocks; and
    add a time-domain guard-band sample by copying and prepending a last $N_{cp}$ sample of each encrypted block.

8. The system of claim 6, wherein each encrypted sample belongs to a distinct OFDM block.

9. The system of claim 7, further comprising a receiver that receives and decrypts a signal transmitted by a second system of claim 7, the receiver including a physical layer having:
- a synchronizer/channel estimator module for removing channel effects before the decryption;
- a decryption module that rearranges the received samples according to the key sequence K; and
- a fast Fourier transform (FFT) and detector module that obtains the original data symbols from the decrypted samples.

* * * * *